S. SZUBA.
SOAP HOLDER.
APPLICATION FILED MAR. 30, 1918.

1,337,852. Patented Apr. 20, 1920.

Witness
F. L. Gibson.
L. B. Middleton.

Inventor
Stanislaw Szuba.
By Victor J. Evans
Attorney

UNITED STATES PATENT OFFICE.

STANISLAW SZUBA, OF ELIZABETH, NEW JERSEY.

SOAP-HOLDER.

1,337,852.  Specification of Letters Patent.  Patented Apr. 20, 1920.

Application filed March 30, 1918.  Serial No. 225,723.

*To all whom it may concern:*

Be it known that I, STANISLAW SZUBA, a citizen of Austria, residing at Elizabeth, in the county of Union and State of New Jersey, have invented new and useful Improvements in Soap-Holders, of which the following is a specification.

This invention relates to new and useful improvements in soap holders and the principal object of the invention is to provide a device of this character which will support the soap on a perforated supporting plate located above a drip pan which is removably supported on the holder.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
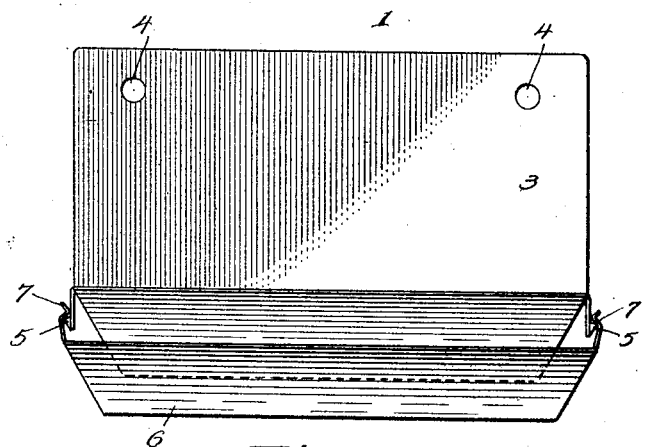
Figure 1 is a front view of the complete device.
Figure 2:
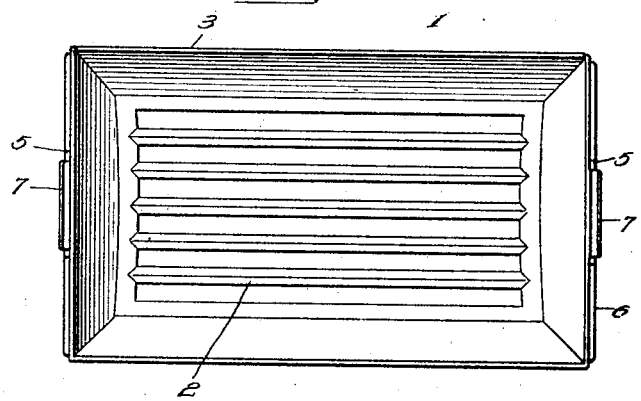
Fig. 2 is a plan view.
Figure 3:
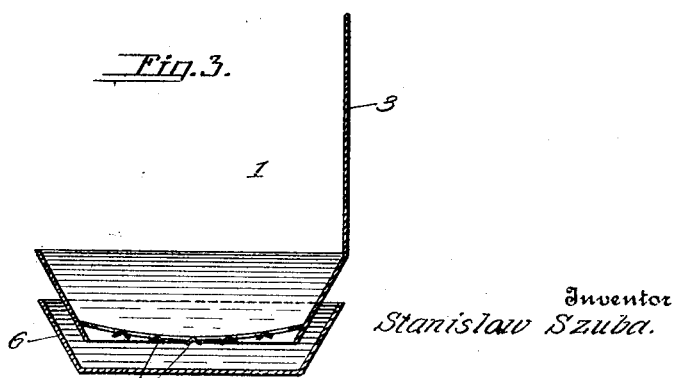
Fig. 3 is a transverse section.

As shown in these views the invention consists of a holder 1 which may be made of any suitable material and of any desired shape. As particularly shown in Figs. 2 and 3, the bottom of the receptacle is formed with a plurality of spaced parallel slots thereby forming a plurality of ribs 2 which extend longitudinally of the receptacle and terminate adjacent the ends of the same. The ribs 2 are each V-shaped in cross section and have their narrowed portions presented upwardly for forming a soap supporting surface. By this construction the free circulation of air about the soap, and particularly the underside of the same, is provided for. As clearly illustrated in Fig. 3, the bottom of the receptacle is curved transversely and therefore only the outer ribs engage a full-sized cake of soap. However, as the cake of soap decreases in size, the inner ribs serve as a supporting means for the soap and the ribs immediately at the sides of the soap prevent the soap from undue movement. The rear side of the holder is extended upwardly to provide a supporting plate 3 which is provided with openings 4 by which said plate may be secured to a wall or the like. A projection 5 is secured to each end of the holder on the outer surface thereof. 6 represents the drip pan engaging with the bottom of the holder and held in sliding engagement therewith by means of the spring arms 7 connected to each end thereof and engages with the projections 5 on the holder. This pan is made to conform to the shape of the holder and covers the bottom thereof so as to receive the water carried by the soap into the holder, said water passing through the spaces between the ribs into said pan.

It will thus be seen that the soap will be kept free of water so that it will quickly dry after being used and that the drip pan may be removed and emptied without removing the holder from its supporting screws.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What I claim is:—

A soap holder comprising an elongated receptacle having outwardly flared side and end walls and a bottom provided with a plurality of spaced slots extending parallel to said side walls and terminating adjacent said end walls, thereby forming a plurality of spaced parallel ribs extending lengthwise of the receptacle, said ribs being V-shaped in cross section and having their narrowed portions presented upwardly for forming a supporting surface for a cake of soap and to permit the free circulation of air about the underside of the cake of soap, a drip pan, and means carried by the end walls of said receptacle and the end walls of the drip pan for detachably connecting the drip pan to the receptacle in spaced relation to the same, the bottom wall of said receptacle being curved transversely whereby only the ribs adjacent the edges of the soap are engaged with the soap.

In testimony whereof I affix my signature.

STANISLAW SZUBA.